Patented June 13, 1939

2,162,214

UNITED STATES PATENT OFFICE 2,162,214

TREATMENT OF FOOD PRODUCTS

Chester J. Conn, Smithtown Branch, N. Y.

No Drawing. Application March 18, 1937,
Serial No. 131,553

5 Claims. (Cl. 99—192)

This invention relates to improvements in methods for treating food products, being particularly directed to a treatment for conditioning food products prior to quick freezing thereof by means of the brine spray or analogous methods.

In present freezing operations, particularly those wherein the freezing medium is a brine spray functioning by direct contact, certain food products, particularly fruits, vegetables and open cuts of meat, absorb excess of salt or other chemical reagents applied in the freezing medium and further, by virtue of the porosity or perviousness of the surface membranes thereof, permit of the formation below the surface of enlarged ice crystals incorporating the freezing chemical reagent, both of which properties lead to the production of improperly frozen and unsatisfactorily appearing products.

Broadly, it is an object of this invention to provide for a preliminary treatment prior to quick freezing of fruits, vegetables or open cuts of meat, whereby there is imparted to the surface membranes thereof a relatively fluid impervious shell formation.

Specifically, it is an object of this invention to apply a preliminary treatment prior to quick freezing of fruits, vegetables and open cuts of meat, whereby there is imparted to the aforesaid products an impervious shell or skin effect, through the disposition of minute frozen particles in the pores of the surface membranes, replacing the fluid normally therein, such effect being essentially restricted to an infinitesimally thin surface zone.

These and other advantages, capabilities and features of the invention will appear from the subjoined detailed description of one specific embodiment thereof.

In carrying out my process reference, for example, being had to the freezing of peas as a representative vegetable, the same, after shelling and grating, are cooled to approximately the temperature of 36° F. by submersion in or spraying with water at a temperature of about 34° F., the product, upon being removed from the treating station having a surface film of moisture or liquid.

With respect to certain food products as, for example, cauliflower or the like, where possibility exists of action and attack through enzymes and catalous growths, it is desirable, prior to the chilling step above outlined, to blanch by dipping the same for a short period in a hot solution at approximately boiling point for a very short period, so that such enzymes and catalous growths will be killed.

Thereafter, the cooled or chilled product whose surface membrane is surrounded by a film of liquid, is passed into a chamber, as, for example, on a pervious purveyor belt or disposed on wire mesh shelves, where, for a period of about five minutes or less, they are subjected to a cold air blast at a pressure of seven or eight pounds at the blower, the temperature of the air blast being from zero to minus 10° F., and the chamber being maintained at atmospheric temperature and at a temperature of about 0° F.

In this step, the product is contacted by the blast on its surface, with the result that the excess chilling liquid forming the surface film is eliminated by dispersion and/or evaporation. As the surface liquid forming the film is dispersed or evaporated by the blast, the surface membrane will consist essentially of solid matter plus the minute fluid particles normally present in its capillaries or pores. The cold blast at the low temperatures and for the short period involved causes a freezing of such minute fluid particles in the pores of the membrane, thereby causing the production of a substantially hard but infinitesimally thin impervious surface formation in the nature of a shell.

By virtue of the formation of this shell penetration by brine fluid in the subsequent quick freezing operations as by spraying or the like, is eliminated, while at the same time, however, heat exchange through penetration into the interior of the product is readily carried out.

It is obvious that various changes and modifications may be made to the details of this process without departing from the general spirit of the invention as set forth in the appended claims.

I claim:

1. A method of treating food products prior to quick freezing, comprising chilling the same by contact with a liquid, and subjecting the chilled product to a blast of air at freezing temperatures to disperse and evaporate substantially all the liquid on the surface of the products and to form minute crystals in the surface pores, thereby to provide a substantially impervious shell formation.

2. A method of treating food products prior to quick freezing, comprising chilling the products by contact with a liquid, whereby a liquid surface film is formed on the product, and subjecting the chilled product to a blast of air at freezing temperatures to disperse and evaporate substantially all the liquid forming the surface film and to form minute crystals in the pores of the surface of said food products, thereby to provide a substantially impervious surface shell.

3. A method of treating food products having a pervious surface, prior to quick freezing thereof, comprising bringing the food products to a temperature slightly above freezing through contact with a liquid, and subjecting the food product to a blast of air for a short period at freezing temperatures, to disperse and evaporate substantially all the liquid present on the surface of the food product and to form minute crystals in the surface pores of the food product.

4. In a method of treating food products having pervious surface membranes, the step after chilling in liquid and prior to quick freezing by brine contact, comprising discharging air at freezing temperatures upon the food products to disperse and evaporate substantially all free liquid from the surface of the food products and to form minute crystals in the pores of the surface membrane.

5. In a method of treating food products having pervious surface membranes, the step after chilling in liquid and prior to quick freezing, comprising discharging upon the food products an air blast of velocity to remove substantially all free liquid from the surface thereof and at a temperature and for a period to form minute ice crystals in the pores of the surface membrane, thereby to provide a substantially impervious surface membrane.

CHESTER J. CONN.